(12) United States Patent
Hiouani et al.

(10) Patent No.: US 11,401,583 B2
(45) Date of Patent: Aug. 2, 2022

(54) ALUMINIUM OR COPPER-CARBON NANOTUBE COMPOSITE MATERIAL AND METHOD FOR PREPARING SAME

(71) Applicant: NEXANS, Courbevoie (FR)

(72) Inventors: Thomas Hiouani, Arras (FR); Paul Royes, Emmerin (FR); Nicolas Masquelier, Phalempin (FR)

(73) Assignee: Nexans, Courbevoie (FR)

( * ) Notice: Subject to any disclaimer, the term of this patent is extended or adjusted under 35 U.S.C. 154(b) by 300 days.

(21) Appl. No.: 16/470,474

(22) PCT Filed: Dec. 14, 2017

(86) PCT No.: PCT/FR2017/053573
§ 371 (c)(1),
(2) Date: Jun. 17, 2019

(87) PCT Pub. No.: WO2018/115645
PCT Pub. Date: Jun. 28, 2018

(65) Prior Publication Data
US 2020/0115776 A1   Apr. 16, 2020

(30) Foreign Application Priority Data
Dec. 22, 2016   (FR) ..................... 1663165

(51) Int. Cl.
*C22C 1/10*   (2006.01)
*C01B 32/174*   (2017.01)
*C22C 21/00*   (2006.01)
*C22C 9/00*   (2006.01)

(52) U.S. Cl.
CPC ............ *C22C 21/00* (2013.01); *C01B 32/174* (2017.08); *C22C 1/1036* (2013.01); *C22C 9/00* (2013.01); *C01B 2202/00* (2013.01); *C22C 2001/1047* (2013.01)

(58) Field of Classification Search
CPC ......... C22C 21/00; C22C 1/1036; C22C 9/00; C22C 2001/1047; C22C 49/14; C22C 2026/002; C22C 26/00; C01B 32/174; C01B 2202/00
See application file for complete search history.

(56) References Cited

U.S. PATENT DOCUMENTS

2012/0160966 A1*   6/2012   Shah ..................... B64G 1/54
244/171.7

FOREIGN PATENT DOCUMENTS

KR   20140023090 A   *   2/2014

OTHER PUBLICATIONS

"Synthesis and characterization of high surface area tin oxide/ functionalized carbon nanotubes composite as anode materials", Materials Chemistry and Physics, Xie et al., vol. 91, Issues 2-3, Jun. 14, 2005 pp. 274-280 (Xie) (Year: 2005).*

(Continued)

*Primary Examiner* — Daniel J. Schleis
*Assistant Examiner* — Kevin Ct Li
(74) *Attorney, Agent, or Firm* — Sofer & Haroun, LLP (57) ABSTRACT

The present invention relates to a composite material based on aluminium or copper and tin oxide-functionalized carbon nanotubes, to the method for producing same and to a cable comprising said composite material as the electrically conductive element.

22 Claims, 2 Drawing Sheets

(56) References Cited

OTHER PUBLICATIONS

"Coating Single-Walled Carbon Nanotubes with Tin Oxide", Han et al., Nano Letters vol. 3, No. 5, 2003, pp. 681-683 (Han). (Year: 2003).*
International Search Report dated Mar. 28, 2018.

* cited by examiner

ALUMINIUM OR COPPER-CARBON NANOTUBE COMPOSITE MATERIAL AND METHOD FOR PREPARING SAME

RELATED APPLICATION

This application is a National Phase of PCT/FR2017/053573 filed on Dec. 14, 2017, which claims the benefit of priority from French Patent Application No. 16 63165, filed on Dec. 22, 2016, the entirety of which are incorporated by reference.

FIELD OF THE INVENTION

The present invention relates to a composite material based on aluminium or copper and tin oxide-functionalized carbon nanotubes, to the method for producing same and to a cable comprising said composite material as the electrically conductive element.

It applies typically but not exclusively to low-voltage (in particular below 6 kV) or medium-voltage (in particular from 6 to 45-60 kV) or high-voltage (in particular above 60 kV, and up to 800 kV) power cables, whether carrying direct current or alternating current, in the fields of aerial, submarine and terrestrial electricity transmission and aeronautics.

More particularly, the invention relates to an electrical cable having good mechanical properties, in particular in terms of tensile strength, and good electrical properties, in particular in terms of electrical conductivity.

DESCRIPTION OF THE RELATED ART

It is known to replace conductors made of copper or copper alloy with conductors made of aluminium or aluminium alloy. Although aluminium is lighter and cheaper than copper, this metal has poor mechanical properties, in particular in terms of tensile strength, which make it difficult to use in the field of cables.

In order to improve the mechanical properties of a conductor made of aluminium or aluminium alloy, Abbasipour et al. [Trans. Nonferrous Met. Soc. China, 2010, 20, 1561] have described an aluminium-carbon nanotube composite material. The composite material is obtained by depositing carbon nanotubes on aluminium particles and injecting, at 700° C., said aluminium particles coated with carbon nanotubes into a matrix of molten aluminium. 1% by mass of magnesium is added to the molten aluminium in order to improve the wettability of the carbon nanotubes within the aluminium matrix. The resulting mixture is then cooled to form a composite material. However, the mechanical strength of the resulting composite material is not optimized for application in the field of cables while being easy to manipulate. Furthermore, the method used to obtain said material is complex.

Other composite materials, based on copper and carbon nanotubes, have been proposed but, there too, the mechanical and electrical properties are not optimized.

OBJECTS AND SUMMARY

Thus, the aim of the present invention is to provide an aluminium- or copper-based composite material which has improved mechanical strength while ensuring good electrical conductivity, which can easily be manipulated for use in the field of cables, in particular as an electrically conductive element for a telecommunication and/or power cable.

Another aim of the invention is to provide a simple and economical method for preparing such a composite material.

Thus, the invention has as its first subject matter a composite material comprising a metal matrix of aluminium, copper, aluminium alloy or copper alloy, and tin oxide-functionalized carbon nanotubes dispersed in said metal matrix.

In the present invention, the carbon nanotubes comprise both single-wall or single-sheet nanotubes (Single-Wall Carbon Nanotubes, SWNT) comprising a single sheet of graphene and multi-wall or multi-sheet nanotubes (Multi-Wall Carbon Nanotubes, MWNT) comprising multiple sheets of graphene nested one inside the other in the manner of Russian dolls, or a single sheet of graphene rolled up on itself multiple times.

In the present invention, the expression "tin oxide-functionalized carbon nanotubes" means that the carbon nanotubes have on their surface tin oxide that can bond with the metal of the metal matrix, and possibly with carbon atoms of other carbon nanotubes.

Indeed, the carbon nanotubes on their own (that is to say naked or non-functionalized carbon nanotubes), while having excellent electrical, thermal and mechanical properties, are difficult to disperse in a metal and in particular in a molten metal. Tangling of the carbon nanotubes into balls, together with low surface reactivity, prevents their dispersion. It is therefore advantageous to have carbon nanotubes whose surface has been modified.

The tin oxide on the surface of the carbon nanotubes serves on one hand to act as a site of attachment to promote bonding between the carbon nanotubes and the metal of the metal matrix, and serves on the other hand to protect the carbon nanotubes when they are mixed with a molten metal to form said composite material.

According to one preferred embodiment of the invention, the composite material comprises approximately 0.1 to 10% by mass, preferably approximately 0.25 to 5% by mass, and more preferably approximately 0.5 to 3% by mass of tin oxide-functionalized carbon nanotubes, relative to the total mass of the composite material.

In one particular embodiment of the invention, the tin oxide-functionalized carbon nanotubes have an average diameter of approximately 5 nm to 50 nm.

The composite material preferably has an electrical conductivity of at least 45% IACS (International Annealed Copper Standard) approximately, more preferably at least 50% IACS, and more preferably still at least 55% IACS approximately.

The composite material preferably has a tensile strength of between 100 and 1000 MPa, more preferably between 110 and 600 MPa approximately, and more preferably between 120 and 400 MPa approximately.

The composite material preferably comprises carbon nanotubes functionalized with tin oxide which are uniformly dispersed within the metal matrix of aluminium, copper, aluminium alloy or copper alloy.

In one particular embodiment, the carbon nanotubes functionalized with tin oxide are in the form of tubes, in particular having a diameter of between 50 and 100 nm approximately, and having a length of several micrometres.

According to one embodiment of the invention, the tin oxide-functionalized carbon nanotubes have an average length of 0.5 to 10 μm approximately, and preferably of 1 to 5 μm approximately.

The length and diameter of the tin oxide-functionalized carbon nanotubes are measured by scanning electron microscopy (SEM).

The composite material is preferably non-porous.

The aluminium content of the aluminium alloy of the metal matrix may be at least 95% by mass, and preferably at least 98% by mass, relative to the total mass of the aluminium alloy.

The aluminium alloy may be chosen from among the aluminium alloys of series 1000 (i.e. minimum 99% aluminium), 5000 (i.e. comprising at least magnesium), 6000 (i.e. comprising at least magnesium and silicon) and 8000 (i.e. comprising less than 99% aluminium).

The aluminium alloy may further comprise one or more inevitable impurities.

Examples of aluminium alloys which may be used in the composite material of the invention include Al1120, Al1370, Al6101, Al6201, Al8030, Al8076 alloys and high-temperature alloys such as alloys of aluminium and zirconium and alloys of aluminium and erbium.

The copper content of the copper alloy of the metal matrix may be at least 95% by mass, and preferably at least 99% by mass, relative to the total mass of the copper alloy.

Examples of copper alloys that may be used in the composite material of the invention include Cu—Sn, Cu—Cr, Cu—Cr—Zr, Cu—Be or Cu—Fe alloys.

The copper alloy may further comprise one or more inevitable impurities.

The carbon nanotubes may be functionalized with tin oxide via appropriate chemical groups which may represent sites of attachment between the carbon nanotubes and the tin oxide.

Chemical groups of this kind may be chosen from among the $SO_3H$, $COOH$, $PO_3H_2$, $OOH$, $OH$, $CHO$ groups and a mixture thereof.

The preferred chemical groups are the COOH groups.

Preferably, the composite material of the invention is devoid of organic polymer(s). Indeed, the presence of organic polymers can degrade its electrical properties, in particular its electrical conductivity.

The composite material of the invention preferably consists exclusively of the carbon nanotubes functionalized with tin oxide (possibly via appropriate chemical groups) and the metal matrix of aluminium, copper, aluminium alloy or copper alloy.

The invention has as its second subject matter a method for preparing a composite material comprising a metal matrix of aluminium, copper, aluminium alloy or copper alloy, and tin oxide-functionalized carbon nanotubes dispersed in said metal matrix, characterized in that it comprises at least the following steps:

i) bringing the tin oxide-functionalized carbon nanotubes into contact with a metal chosen from among aluminium, copper, an aluminium alloy and a copper alloy, said metal being preferably in the molten state, ii) mixing the tin oxide-functionalized carbon nanotubes with the (preferably molten) metal in order to disperse them homogeneously in the molten metal, and iii) forming a solid mass.

The method of the invention makes it easy to form a composite material comprising tin oxide-functionalized carbon nanotubes that are dispersed in a metal matrix of aluminium, copper, aluminium alloy or copper alloy, while having good mechanical properties, in particular in terms of tensile strength, and electrical conductivity properties, in particular by virtue of the homogeneous dispersion of the tin oxide-functionalized carbon nanotubes in the metal.

Step i) may be carried out by the solid route or by the liquid route.

When step i) is implemented by the solid route, it may consist in bringing the tin oxide-functionalized carbon nanotubes, in powder form, into contact with said metal, also in powder form.

When step i) is implemented by the liquid route, it may consist in bringing the tin oxide-functionalized carbon nanotubes, in powder form, into contact with said metal in the molten state.

The liquid route is preferred.

During step i), the tin oxide remains on the surface of the carbon nanotubes and does not diffuse into the molten metal. It thus protects the carbon nanotubes during contact with the molten metal. Moreover, tin is a heavy metal (in comparison to other metals such as copper, nickel or aluminium). The layer of tin oxide on the carbon nanotubes thus serves to avoid them floating in the molten metal and to promote their homogeneous dispersion within the molten metal.

Preferably, the molten metal is in the form of a metal bath of liquid aluminium, copper, aluminium alloy or copper alloy.

According to one particularly preferred embodiment of the invention, step i) is carried out by bringing at least one metal container made of aluminium, copper, aluminium alloy or copper alloy comprising the tin oxide-functionalized carbon nanotubes into contact with said molten metal, said metal container comprising at least one opening intended to receive the tin oxide-functionalized carbon nanotubes and said opening being closed by a closure element that is able to melt, dissolve or detach from the metal container when said metal container is brought into contact with the molten metal.

Thus, by virtue of this closure element, the tin oxide-functionalized carbon nanotubes are confined in said metal container. This serves to avoid, on one hand, the tin oxide-functionalized carbon nanotubes coming into contact with the external environment and thus oxidizing, and, on the other hand, direct handling of the nanotubes and consequently the use of personal protective equipment.

Moreover, this closure element is able to melt or dissolve or detach from the metal container when said metal container is brought into contact with the molten metal. Thus, the closure element can melt, dissolve or detach when the metal container is brought into contact with or mixed with the molten metal, which allows the tin oxide-functionalized carbon nanotubes to be released and permits their homogeneous diffusion within the molten metal. Furthermore, this ability to melt, dissolve or detach serves to avoid an increase of pressure in the internal volume, and thus serves to avoid the formation of clumps of tin oxide-functionalized carbon nanotubes by compaction or sintering.

The density of the tin oxide-functionalized carbon nanotubes is lower than that of the metal of the metal container and the molten metal, and the nanotubes are relatively volatile at high temperatures, for example temperatures of between 550 and 1200° C. approximately. Thus, the presence of the closure element closing the opening of said metal container prevents the tin oxide-functionalized carbon nanotubes from easily escaping from said metal container when the latter is brought into contact with the molten metal. This serves to avoid the tin oxide-functionalized carbon nanotubes from floating in the molten metal, and thus to further improve their wettability in the molten metal.

In particular, step i) is carried out by introducing or injecting at least one metal container as defined above into a liquid metal bath, said bath being at a sufficiently high temperature to cause the closure element of said container to melt, dissolve or detach, and to melt said metal container.

Step i) may be carried out as many times as necessary.

In one particular embodiment, the sufficiently high temperature of step i) is between 660 and 1200° C., and preferably between 700 and 1100° C.

Step i) may be carried out manually or with the aid of an injection system which thus serves to bring said metal container to the core of the liquid metal bath more quickly.

This injection system will be well known to a person skilled in the art, and is designed to receive the metal container and to inject it into the liquid metal bath. It may comprise at least one injector into which the metal container is inserted, a means such as a spring which serves to immobilize the metal container in the injector, and an injection piston which serves to inject the metal container into the liquid metal bath. The injector preferably has essentially the same shape as the metal container.

Preferably, the method of the invention further comprises, prior to step i), a step of holding the container at a temperature of between 50° C. and 100° C. approximately, in particular in an oven.

This holding step may be carried out for several hours, and preferably in the presence of at least one inert gas, in particular chosen from among argon and nitrogen.

In the invention, the expression "inert gas" means that the gas does not react with any other body.

This prior step serves to eliminate the humidity absorbed by the tin oxide-functionalized carbon nanotubes, and to avoid them oxidizing during step i).

In one particular embodiment, the method, and in particular step i), is carried out in the presence of at least one inert gas, preferably chosen from among argon and nitrogen. This serves to avoid oxidation of the carbon nanotubes and/or of the liquid metal bath.

Thus, by virtue of step i), the tin oxide-functionalized carbon nanotubes are plunged directly into the core of the liquid metal bath, and their oxidation and floating at the surface of the liquid metal bath are avoided.

In one particular embodiment, the shape of the metal container is elongate. This serves to improve the diffusion of the tin oxide-functionalized carbon nanotubes within the molten metal.

More particularly, the container may comprise two opposite longitudinal ends, said opening being created in one of said two ends.

The metal container may be a tube having a diameter of between 5 and 100 mm approximately, and preferably between 5 and 15 mm approximately; and having a length of between 5 and 50 cm approximately, and preferably between 5 and 40 cm approximately.

The metal container may have respectively a total mass of between 0.5 g and 6 kg approximately, and preferably between 0.5 g and 100 g approximately, for a volume of molten metal of between 300 ml and 2000 l approximately, and preferably between 300 ml and 2 l approximately. The total mass refers to the sum of the mass of the empty container (i.e. without tin oxide-functionalized carbon nanotubes) and the mass of the tin oxide-functionalized carbon nanotubes.

The metal container may comprise between 1 g and 70 g of tin oxide-functionalized carbon nanotubes.

The closure element may have a melting point or dissolving temperature lower than or equal to the temperature of the molten metal.

The temperature of the molten metal may be between 550 and 1300° C. approximately, and preferably between 700 and 1200° C. approximately.

When the closure element is able to detach from the container, it preferably rises to the surface of the molten metal.

The weight (i.e. the force due to gravity) of the closure element can then be less than the weight (i.e. Archimedes upthrust) of the molten metal.

In one particular embodiment, the metal container comprises at least one inert gas.

Inert gases having a density with respect to air of greater than or equal to approximately 0.9, and preferably greater than or equal to approximately 0.95, are preferred. The presence of such an inert gas in the metal container serves to avoid oxidation of the tin oxide-functionalized carbon nanotubes, in particular at high temperatures (e.g. such as the temperature of the molten metal).

In one preferred embodiment, the inert gas is chosen from among argon and nitrogen.

The metal container preferably contains only the tin oxide-functionalized carbon nanotubes, and possibly the inert gas.

The closure element is preferably non-metallic. The non-metallic closure element is then able to melt or dissolve or detach from the container before the metal of the metal container melts or has completely melted. This promotes the dispersion of the tin oxide-functionalized carbon nanotubes within the molten metal.

In one particularly preferred embodiment of the invention, the closure element is permeable to the gases which may be present in the metal container, and impermeable to solid particles, preferably to nanometre-scale solid particles.

These gases which may be present in the metal container may be the inert gases such as those defined above, or air.

Indeed, this property avoids the metal container exploding in the molten metal, and thus also the rapid ejection of the tin oxide-functionalized carbon nanotubes: since the molten metal is at a high temperature, bringing the metal container into contact with said molten metal could give rise to an abrupt rise in pressure in the metal container. The permeable closure element allows the gases which may be present in the metal container to be released into the molten metal when the metal container is brought into contact with said molten metal, which serves to avoid a rise in pressure in the metal container, and thus the sudden ejection, from the metal container, of the tin oxide-functionalized carbon nanotubes. The tin oxide-functionalized carbon nanotubes are thus released into the molten metal once the closure element has melted or has dissolved into the molten metal or has detached from the metal container, and possibly once the metal container has melted into the molten metal.

The closure element may be made of cellulosic material (i.e. cellulose-based).

In one particular embodiment, the closure element is one or more filters, and preferably one or more nanometric filters, and still more preferably one or more nanometric filters made of paper.

Preferably, the closure element is not permanently fixed to the metal container, and/or is not an integral part of the metal container. This means that it can detach, melt or dissolve more easily, independently of the dissolving of the metal container in the molten metal.

Preferably, the closure element closes the metal container by means of a metal wire that is able to melt, dissolve or detach when the metal container is brought into contact with the molten metal.

In one particular embodiment, the metal of the metal wire is chosen from among copper, aluminium, a copper alloy and an aluminium alloy.

In one particular embodiment, the metal of the metal container is chosen from among copper, aluminium, a copper alloy and an aluminium alloy.

The metal of the metal container may be identical to or different from the molten metal. Preferably, the metal of the metal container is identical to the molten metal.

The metal of the metal wire may be identical to or different from the metal of the metal container. Preferably, the metal of the metal wire is identical to the metal of the metal container.

Step ii) may be carried out by techniques well known to a person skilled in the art, such as mechanical agitation, magnetic agitation or the use of an electromagnetic current.

When a metal container is used, step ii) serves to make said metal container melt completely.

When step i) is implemented by the solid route, step iii) may be a step of compacting the powders.

When step i) is implemented by the liquid route, step iii) may be carried out by casting the mixture of the preceding step ii) to form said composite material.

Said composite material obtained from the method has improved mechanical and electrical properties.

In one particular embodiment, step iii) is carried out at a temperature of between 660° C. and 1200° C. approximately, and preferably between 700° C. and 1100° C. approximately. This step iii) may comprise a cooling (i.e. solidification) step, in particular at a controlled rate.

The method may further comprise a step $i_0$) of preparing the tin oxide-functionalized carbon nanotubes.

This step has the advantage of not degrading the initial properties of the naked (i.e. non-functionalized) carbon nanotubes. Indeed, tin has a low melting point (231.9° C.). Thus, it does not require high temperatures to be deposited uniformly on the carbon nanotubes (as is the case for example for nickel, copper or aluminium).

Preferably, step $i_0$) comprises the following sub-steps:
possibly a sub-step $i_{01}$) of functionalizing carbon nanotubes with appropriate chemical groups which may represent sites of attachment between the carbon nanotubes and the tin oxide,
a sub-step $i_{02}$) of bringing commercial functionalized carbon nanotubes, or functionalized carbon nanotubes as prepared in the preceding sub-step if such a sub-step exists, into contact with a tin precursor, and
a sub-step $i_{03}$) of heating.

The chemical groups may be chosen from among the $SO_3H$, $COOH$, $PO_3H_2$, OOH, OH, CHO groups and a mixture thereof.

The preferred chemical groups are the COOH groups.

Examples include multi-sheet carbon nanotubes functionalized with carboxyl groups, such as those marketed under the trade name MWNT-COOH® by Alpha Nano Tech Inc. or by Nanocyl.

Various methods well known to a person skilled in the art exist for carrying out sub-step $i_{01}$) and thus modifying in advance the surface of the carbon nanotubes.

Examples include electrochemical oxidation at the decomposition potential of water, acid treatment (e.g. with sulfuric acid, nitric acid, citric acid, orthophosphoric acid, oxalic acid or a mixture of these), the use of $KMnO_4$, oxidation in the gaseous phase, plasma treatment, electrochemical oxidation of primary and secondary amines, of alcohols, of carboxylates, of hydrazides, or reduction of diazonium salts.

Sub-step $i_{01}$) is preferably carried out by acid treatment of the carbon nanotubes, in particular using sulfuric acid.

In particular, the non-functionalized (i.e. naked) carbon nanotubes may be introduced into a liquid medium comprising citric acid and water, and dispersed using ultrasound. Then an oxidizing agent such as sulfuric acid is added to the resulting dispersion, which is then brought to reflux and then cooled. The functionalized carbon nanotubes are then filtered then washed in water until a neutral pH is reached. This yields functionalized carbon nanotubes having, on the surface, oxygenated chemical groups of the type of diketone, ether, carboxylic acid, ester, hydroxyl, enol or other groups.

The tin precursor may be chosen from among tin sulfate and tin chloride.

Sub-step $i_{02}$) may be carried out in the presence of a dispersant, in particular chosen from among sodium dodecyl sulfate (SDS) and cetyltrimethylammonium bromide (CTAB).

Sub-step $i_{02}$) may be carried out under magnetic agitation and/or in the presence of sequenced ultrasound.

Sub-step $i_{02}$) may be carried out by introducing, into water, the carbon nanotubes of step $i_{01}$) or commercial carbon nanotubes, adding the dispersant then the tin precursor, and subjecting the resulting mixture to sequenced ultrasound.

The heating sub-step $i_{03}$) may be carried out at a temperature of between 80 and 350° C. approximately.

It may comprise a sub-step of drying the mixture of sub-step $i_{02}$) in order to form a paste (e.g. evaporation of the solvents), then a sub-step of heat treatment, in particular in a closed ceramic crucible.

The drying sub-step may be carried out at a temperature of between 80 and 200° C. approximately.

The heat treatment sub-step may be carried out at a temperature above the melting point of tin (i.e. 231.9° C.), and in particular between 250 and 350° C. approximately.

The method in accordance with the invention may further comprise, after step iii), at least one forming step iv) which will be well known to a person skilled in the art, such as a step of rolling, cold working (e.g. a step of drawing) or extrusion, so as to obtain a composite, elongate, electrically conductive element having the desired shape and dimensions.

The present invention has, as its third subject matter, a composite material obtained in accordance with the method according to the second subject matter of the invention.

The composite material obtained in accordance with the method according to the second subject matter of the invention may be a composite material as defined in the first subject matter of the invention.

The present invention also has, as its fourth subject matter, an electrical cable comprising at least one composite material according to the first subject matter of the invention, or obtained in accordance with the method according to the second subject matter of the invention.

Said cable has improved mechanical and electrical properties.

Thus, the composite material is used as an elongate, electrically conductive element in said cable.

In one particular embodiment, the composite material may be in the form of a composite strand of round, trapezoidal or Z-shaped cross section.

In one embodiment, the cable comprises multiple composite strands, and preferably an assembly of composite strands.

This assembly may in particular form at least one layer of the continuous envelope type, for example of circular or oval or even square cross section.

According to a particularly preferred embodiment of the invention, the cable may be an OHL cable.

Consequently, it may comprise an elongate, preferably central, reinforcing element, it being possible for said assembly to be positioned around the elongate reinforcing element.

When the composite strands are of round cross section, they may have a diameter of between 2.25 mm and 4.75 mm. When the strands are of non-round cross section, their equivalent round cross section diameter may also be between 2.25 mm and 4.75 mm.

Of course it is preferable for all of the strands making up an assembly to have the same shape and the same dimensions.

In one preferred embodiment of the invention, the elongate reinforcing element is surrounded by at least one layer of an assembly of composite strands.

Preferably, the composite strands that make up at least one layer of an assembly of composite strands are able to give said layer an essentially regular surface, it being possible for each of the strands making up the layer to have, in particular, a cross section of which the shape is complementary to that of the adjacent strand(s).

According to the invention, the phrase "composite strands able to give said layer an essentially regular surface, it being possible for each of the strands making up the layer to have, in particular, a cross section of which the shape is complementary to that of the adjacent strand(s)" is to be understood as meaning that the juxtaposition or fitting together of the assembly of strands making up the layer forms a continuous envelope (with no irregularities), for example of circular or oval or even square cross section.

Thus, the strands of Z-shaped or trapezium-shaped cross section make it possible to obtain a regular envelope, whereas strands of round cross section do not. In particular, strands of Z-shaped cross section are preferred.

More preferably still, said layer formed by the assembly of the composite strands has an annular cross section.

The elongate reinforcing element may typically be a composite or metallic element. Examples include steel strands or composite strands of aluminium in an organic matrix.

The composite strands may be twisted around the elongate reinforcing element, in particular when the cable comprises an assembly of composite strands.

In one particular embodiment, the electrical cable of the invention comprises at least one electrically insulating layer surrounding said composite material or the plurality of composite materials, said electrically insulating layer comprising at least one polymer material.

The polymer material of the electrically insulating layer of the cable of the invention may be chosen from among the cross-linked and non-cross-linked polymers, the polymers of the inorganic and of the organic type.

The polymer material of the electrically insulating layer may be a homo- or co-polymer having thermoplastic and/or elastomeric properties.

The polymers of the inorganic type may be polyorganosiloxanes.

The polymers of the organic type may be polyolefins, polyurethanes, polyamides, polyesters, polyvinyls or halogenated polymers such as fluorinated polymers (e.g. polytetrafluoroethylene or PTFE) or chlorinated polymers (e.g. polyvinyl chloride or PVC).

The polyolefins may be chosen from among ethylene and propylene polymers. Examples of ethylene polymers may include linear low-density polyethylenes (LLDPE), low-density polyethylenes (LDPE), medium-density polyethylenes (MDPE), high-density polyethylenes (HDPE), ethylene-vinyl acetate copolymers (EVA), ethylene-butyl acrylate copolymers (EBA), ethylene-methyl acrylate copolymers (EMA), ethylene-2-ethylhexyl acrylate copolymers (2HEA), copolymers of ethylene and of alpha-olefins such as, for example, polyethylene-octenes (PEO), ethylene-propylene copolymers (EPR), ethylene/ethyl acrylate copolymers (EEA), or ethylene-propylene terpolymers (EPT) such as, for example, ethylene-propylene diene monomer terpolymers (EPDM).

More particularly, the electrical cable in accordance with the invention may be an electrical cable of the energy cable type.

For example, the cable of the invention may comprise a composite material according to the first subject matter of the invention or obtained in accordance with the method according to the second subject matter of the invention, a first semiconductive layer surrounding said composite material, an electrically insulating layer surrounding the first semiconductive layer and a second semiconductive layer surrounding the electrically insulating layer.

The electrically insulating layer is as defined previously.

In one particular embodiment, generally in accordance with the electrical cable of the energy cable type of the invention, the first semiconductive layer, the electrically insulating layer and the second semiconductive layer form a three-layer insulation. In other words, the electrically insulating layer is in direct physical contact with the first semiconductive layer, and the second semiconductive layer is in direct physical contact with the electrically insulating layer.

The electrical cable of the invention may further comprise a metal screen surrounding the second semiconductive layer.

This metal screen may be a screen of the "wire" type, consisting of an assembly of copper or aluminium conductors arranged around and along the second semiconductive layer, a screen of the "ribbon" type, consisting of one or more conductive metal ribbons arranged in a helix around the second semiconductive layer, or a screen of the "sealed" type, consisting of a metal tube surrounding the second semiconductive layer. This last screen type serves in particular as a barrier to humidity which tends to enter the electrical cable in the radial direction.

All the types of metal screens may be used to ground the electrical cable, and may thus channel fault currents, for example in the case of a short circuit in the related network.

Furthermore, the cable of the invention may comprise an outer protective sheath surrounding the second semiconductive layer, or more particularly surrounding said metal screen, if this screen is present. This outer protective sheath may be produced conventionally from appropriate thermoplastic materials such as HDPEs, MDPEs or LLDPEs; or from flame-retardant or flame-resistant materials. In particular, if these latter materials contain no halogens, they are referred to as HFFR (Halogen Free Flame Retardant) sheathing.

Other layers, such as layers that swell in the presence of humidity, may be added between the second semiconductive layer and the metal screen if such a screen is present, and/or between the metal screen and the outer sheath if these are present, these layers serving to guarantee the longitudinal watertightness of the electrical cable.

BRIEF DESCRIPTION OF THE DRAWINGS

Other features and advantages of the present invention will emerge in light of the following examples with reference to the annotated figures, said examples and figures being provided by way of entirely non-limiting illustration.

DETAILED DESCRIPTION

For reasons of clarity, only the elements essential to the understanding of the invention have been presented diagrammatically, without regard to scale.

Figure 1:
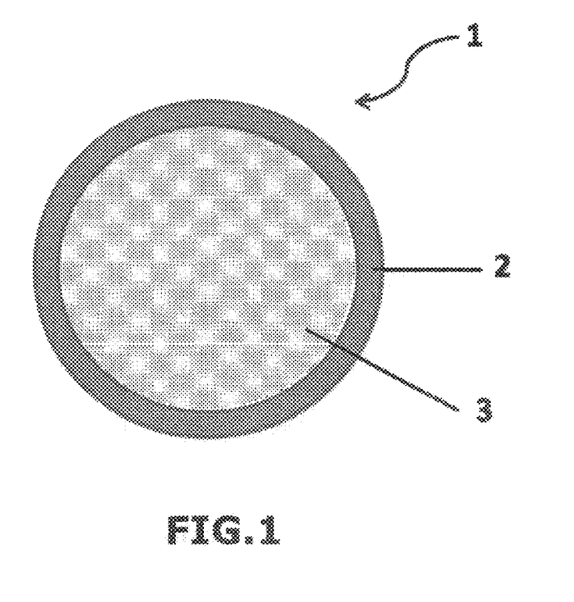
FIG. 1 shows, schematically, a structure in cross section of a first variant of an electrical cable according to the invention.

FIG. 1 shows a first variant of an electrical cable 1 according to the invention, seen in cross section, comprising a composite material 3 according to the first subject matter of the invention or obtained in accordance with the method according to the second subject matter of the invention and an electrically insulating layer 2 surrounding said composite material 3.

Figure 2:
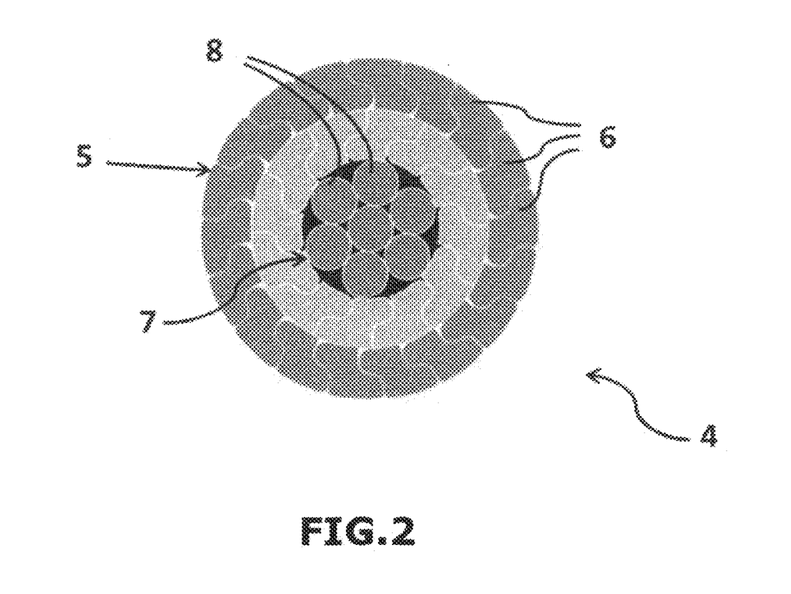
FIG. 2 shows, schematically, a structure in cross section of a second variant of an electrical cable according to the invention.

FIG. 2 shows a second variant of an electrical cable 4 for high-voltage electrical transmission of the OHL type according to the invention, seen in cross section, comprising three layers of an assembly 5 of composite strands 6, each composite strand consisting of a composite material according to the invention. These three layers 5 surround an elongate central reinforcing element 7. The composite strands 6 forming said layers 5 have a Z-shaped (or S-shaped, depending on the orientation of the Z) cross section. The elongate central reinforcing element 7 shown in FIG. 2 may for example be steel strands 8 or composite strands of aluminium in an organic matrix.

In the embodiment shown in FIG. 2, it is possible to modify the number of composite strands 6 of each layer 5, their shape, the number of layers 5 or else the number of steel strands or composite strands 8.

Figure 3:
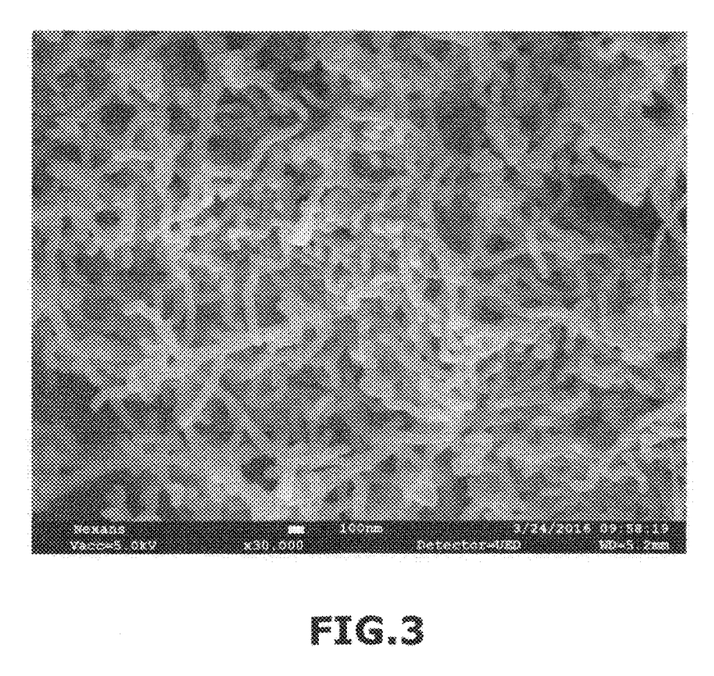
FIG. 3 shows tin oxide-functionalized carbon nanotubes.

FIG. 3 shows tin oxide-functionalized carbon nanotubes obtained in accordance with the method according to the invention.

Preparation of Composite Materials According to the Invention and Obtained in Accordance with the Method According to the Invention 1.1 Preparation of Tin Oxide-Functionalized Carbon Nanotubes A liquid medium comprising water and citric acid. Non-functionalized (i.e. naked) carbon nanotubes marketed under the identifier Nanocyl NC 7000 were then introduced into the liquid medium, then dispersed using ultrasound. The resulting dispersion was transferred to a round-bottomed flask containing sulfuric acid, then the resulting dispersion was brought to reflux for at least 1 h with agitation, then cooled. The functionalized carbon nanotubes were then filtered then washed in water until a neutral pH was reached.

The carbon nanotubes functionalized with acid groups were introduced into a beaker of distilled water with magnetic agitation, then a dispersant of the cetyltrimethylammonium bromide (CTAB) or sodium dodecyl sulfate (SDS) type was added, still with intense magnetic agitation, then with the aid of ultrasound. Then, tin sulfate was added with magnetic agitation, then with the aid of sequenced ultrasound. The resulting mixture was dried between 80 and 150° C. until evaporation of the solvents and formation of a relatively compact paste. Then the paste was heat-treated in an oven at 150° C. for at least 2 h, then at 280° C. for at least 3 h (step $i_0$).

1.2 Preparation of the Composite Material of the Invention

Step i) was carried out using 6 metal containers as defined in the invention. The metal containers were in the form of tubes made of aluminium alloy (Al 1350®), 9.5 mm in diameter and between 5 and 10 cm in length. Each of the tubes was filled with 2 g of tin oxide-functionalized carbon nanotubes as prepared in example 1.1. The closure element consisted of two nanometric filters made of paper. The closure element closes the opening of said tube by means of a metal wire made of aluminium (Al 1350®).

The metal contents comprising the tin oxide-functionalized carbon nanotubes were injected into 1.2 kg of a bath of an aluminium alloy (Al 1350®) by means of an injector under a nitrogen atmosphere.

The contents were mixed with the bath of liquid aluminium alloy using a rotating paddle mixer (mechanical and electromagnetic agitation) (step ii)).

Then, the resulting mixture was cast into a preformed metal mould so as to form a composite material according to the invention in the form of a solid mass (step iii)).

The obtained composite material was rolled to pass from a diameter of approximately 30 mm to a diameter of approximately 10 mm, then drawn to the final desired diameter.

Table 1 below shows the results in terms of electrical conductivity (in % IACS) and tensile strength (in MPa) of the composite materials $M_1$ and $M_2$ of the invention respectively having final diameters of 9.55 mm and 3.3 mm, and by way of comparison of aluminium alloys $M_1'$ and $M_2'$ comprising no tin oxide-functionalized carbon nanotubes (i.e. not in accordance with the invention), respectively having diameters of 9.55 mm and 3.3 mm.

TABLE 1

|  | Conductivity % IACS | Tensile strength (MPa) |
| --- | --- | --- |
| $M_1$ | 53.1 | 137.2 |
| $M_1'$ | 62.5 | 116.4 |
| $M_2$ | 53.5 | 193.1 |
| $M_2'$ | 62.5 | 162.6 |

The presence of the tin oxide-functionalized carbon nanotubes serves to improve the mechanical strength of the composite material while ensuring acceptable electrical conductivity.

$M_1$ and $M_2$ comprised approximately 1% by mass of tin oxide-functionalized carbon nanotubes.

The invention claimed is:

1. A composite material comprising:
   a metal matrix of aluminium, copper, aluminium alloy or copper alloy, and tin oxide-functionalized carbon nanotubes dispersed in said metal matrix.

2. The composite material according to claim 1, wherein said composite material comprises from 0.1 to 10% by mass of tin oxide-functionalized carbon nanotubes, relative to the total mass of the composite material.

3. The composite material according to claim 1, wherein said composite material has an electrical conductivity of at least 50% IACS.

4. The composite material according to claim 1, wherein said composite material has a tensile strength of between 100 and 1000 MPa.

5. A method for preparing the composite material as claimed in claim 1, wherein said method comprises at least the following steps:

i) bringing the tin oxide-functionalized carbon nanotubes into contact with a metal chosen from among aluminium, copper, an aluminium alloy and a copper alloy, ii) mixing the tin oxide-functionalized carbon nanotubes with the metal in order to disperse them homogeneously in the molten metal, and iii) forming a solid mass.

6. The method according to claim 5, wherein said metal is in the molten state.

7. The method according to claim 6, wherein step i) is carried out by bringing at least one metal container made of aluminium, copper, aluminium alloy or copper alloy comprising tin oxide-functionalized carbon nanotubes into contact with said molten metal, said metal container comprising at least one opening intended to receive the tin oxide-functionalized carbon nanotubes and said opening being closed by a closure element that is able to melt, dissolve or detach from the metal container when said metal container is brought into contact with the molten metal.

8. The method according to claim 7, wherein step i) is carried out by introducing or injecting at least one metal container as defined in claim 7 into a liquid metal bath, said bath being at a sufficiently high temperature to cause the closure element of said container to melt, dissolve or detach, and to melt said metal container.

9. The method according to claim 8, wherein the sufficiently high temperature of step i) is between 550 and 1200° C.

10. The method according to claim 7, wherein the closure element is one or more nanometric filters made of paper.

11. The method according to claim 6, wherein step iii) is carried out by casting the mixture of the preceding step ii) to form said composite material.

12. The method according to claim 5, wherein said method further comprises a step $i_0$) of preparing the tin oxide-functionalized carbon nanotubes, comprising the following sub-steps:

possibly a sub-step $i_{01}$) of functionalizing carbon nanotubes with appropriate chemical groups which may represent sites of attachment between the carbon nanotubes and the tin oxide, a sub-step $i_{02}$) of bringing the commercial functionalized carbon nanotubes, or the functionalized carbon nanotubes as prepared in the preceding sub-step if such a sub-step exists, into contact with a tin precursor, and a sub-step $i_{03}$) of heating.

13. The method according to claim 12, wherein sub-step $i_{01}$) is carried out by acid treatment of the carbon nanotubes with sulfuric acid.

14. The method according to claim 12, wherein the tin precursor is tin sulfate.

15. A composite material, wherein said composite material comprises a metal matrix of aluminium, copper, aluminium alloy or copper alloy, and tin oxide-functionalized carbon nanotubes dispersed in said metal matrix, and wherein said composite material is obtained according to the method as defined in claim 5.

16. An electrical cable, wherein said electrical cable comprises at least one composite material as defined in claim 1.

17. The cable according to claim 16, wherein said cable is an OHL cable comprising an elongate reinforcing element and an assembly of composite strands positioned around the elongate reinforcing element.

18. The cable according to claim 16, wherein said cable comprises at least one electrically insulating layer surrounding said composite material or the plurality of composite materials, said electrically insulating layer comprising at least one polymer material.

19. The cable according to claim 16, wherein each one of the composite strands is a composite material comprising a metal matrix of aluminium, copper, aluminium alloy or copper alloy, and tin oxide-functionalized carbon nanotubes dispersed in said metal matrix.

20. The composite material according to claim 1, wherein said composite material comprises from 0.25 to 5% by mass of tin oxide-functionalized carbon nanotubes, relative to the total mass of the composite material.

21. The composite material according to claim 1, wherein said composite material has a tensile strength of between 110 and 600 MPa.

22. The composite material according to claim 1, wherein the tin oxide-functionalized carbon nanotubes are uniformly dispersed within the metal matrix of aluminium, copper, aluminium alloy or copper alloy.

\* \* \* \* \*